United States Patent [19]
Hoashi et al.

[11] Patent Number: 5,805,527
[45] Date of Patent: Sep. 8, 1998

[54] METHOD AND APPARATUS FOR MEASURING DISTANCE

[75] Inventors: Yoshiaki Hoashi, Toyota; Noriaki Shirai, Oobu, both of Japan

[73] Assignee: Denso Corporation, Kariya, Japan

[21] Appl. No.: 773,901

[22] Filed: Dec. 27, 1996

[30] Foreign Application Priority Data

Dec. 27, 1995  [JP]  Japan ................................ 7-341454
Nov. 1, 1996  [JP]  Japan ................................ 8-291651

[51] Int. Cl.$^6$ ............................................. G01S 15/00
[52] U.S. Cl. ............................................. 367/99; 367/98
[58] Field of Search .................... 367/98, 99, 127; 342/91, 92

[56] References Cited

U.S. PATENT DOCUMENTS

| | | | |
|---|---|---|---|
| 4,905,207 | 2/1990 | Fellinger et al. | 367/99 |
| 5,574,463 | 11/1996 | Shirai et al. | 342/70 |
| 5,631,639 | 5/1997 | Hibino et al. | 340/903 |

FOREIGN PATENT DOCUMENTS

| | | |
|---|---|---|
| 58-205879 | 11/1983 | Japan . |
| 2-223884 | 9/1990 | Japan . |
| 3-65678 | 3/1991 | Japan . |
| 7-262498 | 10/1995 | Japan . |
| 7-262499 | 10/1995 | Japan . |
| 7-291063 | 11/1995 | Japan . |
| 7-294634 | 11/1995 | Japan . |
| 7-296298 | 11/1995 | Japan . |
| 7-318652 | 12/1995 | Japan . |
| 8-279099 | 10/1996 | Japan . |
| 878111 | 9/1961 | United Kingdom ............. 367/98 |

*Primary Examiner*—Daniel T. Pihulic
*Attorney, Agent, or Firm*—Cushman, Darby & Cushman IP Group of Pillsbury Madison & Sutro LLP

[57] ABSTRACT

A distance measuring apparatus includes a wave transmitting device for emitting a transmission wave. A wave receiving device is operative for receiving a reflection wave, which results from reflection of the transmission wave by a reflection object, as a reception wave. A time difference measuring device is operative for measuring a time difference between a moment at which the wave transmitting device emits the transmission wave and a moment at which the wave receiving device receives the reception wave. A distance calculating device is operative for calculating a distance to the reflection object on the basis of the time difference calculated by the time difference measuring device. An error correcting device is operative for detecting a time interval during which a signal level of the reception wave remains higher than a predetermined threshold level, and for correcting an error in the calculated distance to the reflection object on the basis of the detected time interval, the error being caused by a difference in intensity of the reception wave.

15 Claims, 12 Drawing Sheets

METHOD AND APPARATUS FOR MEASURING DISTANCE

BACKGROUND OF THE INVENTION

1. Field of the Invention

This invention relates to a method of measuring a distance which uses wave. This invention also relates to an apparatus for measuring a distance which uses wave.

2. Description of the Prior Art

Some distance measuring apparatuses emit wave toward an object, and receive reflected wave or echo wave from the object. The distance measuring apparatuses detect the time difference (the time interval) between the moment of the emission of wave and the moment of the reception of echo wave (reflected wave), and calculate the distance to the object on the basis of the detected time difference. For example, a train of pulses of light wave or millimeter radio wave is used as emitted wave.

In general, the accuracy of a decision as to the moment of the reception of echo wave tends to decrease as the intensity of echo wave drops. An inaccurate decision as to the moment of the reception of echo wave results in an inaccurate measurement of the distance to the object.

SUMMARY OF THE INVENTION

It is an object of this invention to provide an improved method of measuring a distance.

It is another object of this invention to provide an improved apparatus for measuring a distance.

A first aspect of this invention provides a distance measuring apparatus comprising wave transmitting means for emitting a transmission wave; wave receiving means for receiving a reflection wave, which results from reflection of the transmission wave by a reflection object, as a reception wave; time difference measuring means for measuring a time difference between a moment at which the wave transmitting means emits the transmission wave and a moment at which the wave receiving means receives the reception wave; distance calculating means for calculating a distance to the reflection object on the basis of the time difference calculated by the time difference measuring means; and error correcting means for detecting a time interval during which a signal level of the reception wave remains higher than a predetermined threshold level, and for correcting an error in the calculated distance to the reflection object on the basis of the detected time interval, the error being caused by a difference in intensity of the reception wave.

A second aspect of this invention is based on the first aspect thereof, and provides a distance measuring apparatus wherein the error correcting means comprises time interval calculating means for calculating the time interval during which the signal level of the reception wave remains higher than the predetermined threshold level; and time difference correcting means for correcting the time difference, measured by the time difference measuring means, on the basis of the calculated time interval.

A third aspect of this invention is based on the first aspect thereof, and provides a distance measuring apparatus wherein the error correcting means comprises time interval calculating means for calculating the time interval during which the signal level of the reception wave remains higher than the predetermined threshold level; and distance correcting means for correcting the distance to the reflection object, which is calculated by the distance calculating means, on the basis of the calculated time interval.

A fourth aspect of this invention is based on the second aspect thereof, and provides a distance measuring apparatus wherein the time interval calculating means comprises signal level judgment means for inputting a signal of the reception wave into the time difference measuring means while the signal level of the reception wave remains higher than the predetermined threshold level.

A fifth aspect of this invention is based on the second aspect thereof, and provides a distance measuring apparatus wherein the time difference correcting means comprises reference time difference calculating means for calculating a second time difference between the moment of emission of the transmission wave and a middle point in the time interval during which the signal level of the reception wave remains higher than the predetermined threshold level; and means for correcting the time difference, measured by the time difference measuring means, on the basis of the calculated second time difference.

A sixth aspect of this invention is based on the second aspect thereof, and provides a distance measuring apparatus wherein the time difference correcting means comprises means for detecting a second time difference between the moment of emission of the transmission wave and a moment at which the signal of the reception wave rises or drops to the predetermined threshold level; and means for correcting the time difference, measured by the time difference measuring means, on the basis of the calculated second time difference.

A seventh aspect of this invention is based on the fourth aspect thereof, and provides a distance measuring apparatus further comprising second signal level judgment means having a second predetermined threshold level higher than the previously-indicated predetermined threshold level; and means for correcting the time difference, measured by the time difference measuring means, on the basis of a time interval during which the signal of the reception wave remains higher than the second predetermined threshold level.

An eighth aspect of this invention provides a method of measuring a distance which comprises the steps of detecting a time difference between a moment of emission of a transmission wave and a moment of reception of a reflection wave as a reception wave which results from reflection of the transmission wave by a reflection object; calculating a distance to the reflection object from the detected time difference; detecting a time interval during which a signal level of the reception wave remains higher than a predetermined threshold level; and correcting the calculated distance to the reflection object on the basis of the detected time interval.

A ninth aspect of this invention is based on the eighth aspect thereof, and provides a method wherein the time difference is corrected into a correction-resultant time difference on the basis of the time interval during which the signal level of the reception wave remains higher than the predetermined threshold level, and the distance to the reflection object is calculated on the basis of the correction-resultant time difference.

A tenth aspect of this invention is based on the eighth aspect thereof, and provides a method wherein detection is made as to a second time difference between the moment of emission of the transmission wave and a middle point in the time interval during which the signal level of the reception wave remains higher than the predetermined threshold level, and the second time difference is corrected on the basis of the time interval.

An eleventh aspect of this invention is based on the tenth aspect thereof, and provides a method wherein the second time difference between the moment of emission of the transmission wave and the middle point is corrected to be equal to a time difference between the moment of emission of the transmission wave and a moment at which the signal level of the reception wave reaches a maximum level.

A twelfth aspect of this invention is based on the eighth aspect thereof, and provides a method wherein detection is made as to a second time difference between the moment of emission of the transmission wave and a moment at which the signal of the reception wave rises or drops to the predetermined threshold level, and the second time difference is corrected on the basis of the time interval.

A thirteenth aspect of this invention is based on the twelfth aspect thereof, and provides a method wherein the second time difference between the moment of emission of the transmission wave and the moment at which the signal of the reception wave rises or drops to the predetermined threshold level is corrected to be equal to a time difference between the moment of emission of the transmission wave and a moment at which the reception wave starts to rise.

A fourteenth aspect of this invention is based on the eighth aspect thereof, and provides a method wherein a second predetermined threshold level is higher than the previously-indicated predetermined threshold level, and the time difference is corrected on the basis of a time interval during which the signal of the reception wave remains higher than the second predetermined threshold level.

A fifteenth aspect of this invention provides an apparatus for measuring a distance to an object which comprises first means for emitting a forward wave toward the object; second means connected to the first means for detecting a first moment at which the first means emits the forward wave toward the object; third means for receiving an echo wave coming from the object, and for converting the echo wave into a corresponding electric signal, the echo wave resulting from reflection of the forward wave by the object; fourth means for deciding whether or not a level represented by the electric signal generated by the third means is higher than a predetermined threshold level; fifth means responsive to a result of the deciding by the fourth means for detecting a second moment at which the level represented by the electric signal increases across the predetermined threshold level; sixth means responsive to the result of the deciding by the fourth means for detecting a time interval during which the level represented by the electric signal remains higher than the predetermined threshold level; seventh means for estimating a third moment, at which the echo wave reaches the third means, in response to the second moment detected by the fifth means and the time interval detected by the sixth means; eighth means for calculating a time difference between the first moment detected by the second means and the third moment estimated by the seventh means; and ninth means for measuring the distance to the object in response to the time difference calculated by the eighth means.

DESCRIPTION OF THE PREFERRED EMBODIMENTS

Prior-art distance measuring apparatuses will be explained hereinafter for a better understanding of this invention.

A first prior-art distance measuring apparatus emits a pulse of wave toward an object, and receives a reflected pulse or an echo pulse of wave. The first prior-art distance measuring apparatus has a receiver which converts the received echo pulse of wave into a corresponding electric signal. The voltage of the electric signal depends on the intensity of the received echo pulse of wave.

Figure 1:
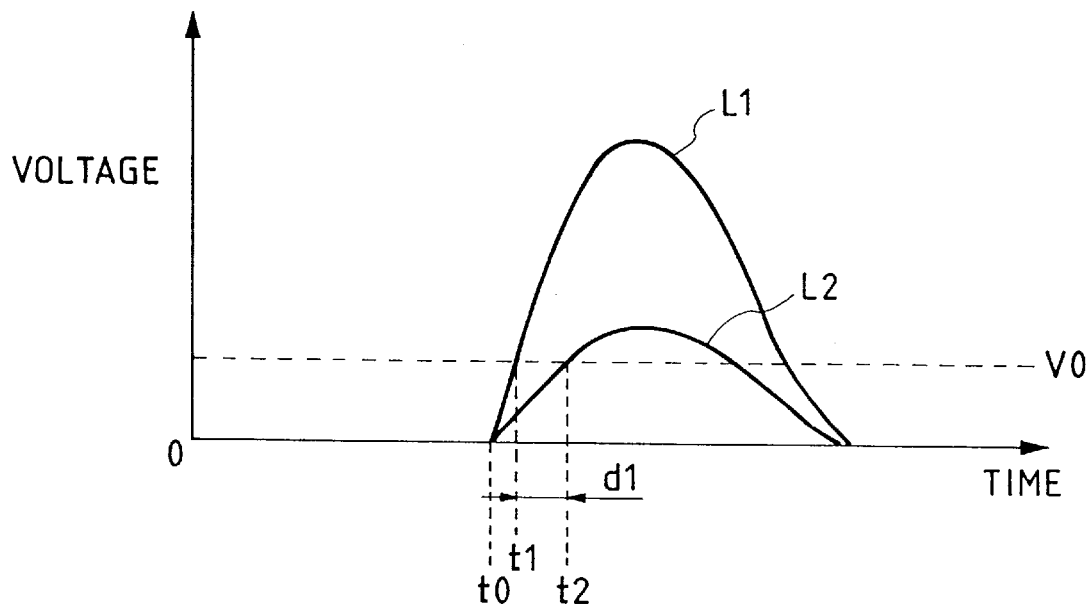
FIG. 1 is a time-domain diagram of examples of a voltage of an electric signal in a first prior-art distance measuring apparatus.

In FIG. 1, "L1" denotes a time-domain variation in the voltage of the electric signal which corresponds to a received echo pulse having a relatively high peak intensity. In addition, "L2" denotes a time-domain variation in the voltage of the electric signal which corresponds to a received echo pulse having a relatively low peak intensity.

The first prior-art distance measuring apparatus compares the voltage of the electric signal with a predetermined reference voltage (a predetermined threshold voltage) V0. The first prior-art distance measuring apparatus detects the moment at which the voltage of the electric signal rises to the predetermined reference voltage V0. The detected moment is used as the moment of the reception of the echo pulse. In the first prior-art distance measuring apparatus, the distance between the object and the apparatus is calculated on the basis of the time difference (the time interval) between the moment of the emission of the pulse and the moment of the reception of the echo pulse. The predetermined reference voltage V0 is chosen to prevent an adverse influence of noise on the decision as to the moment of the reception of the echo pulse.

In FIG. 1, "t0" denotes the true moment of the reception of echo pulses corresponding to the electric signals L1 and L2. The electric signal L1 which has a relatively high peak voltage reaches the predetermined reference voltage V0 at a moment t1 following the moment t0. The electric signal L2 which has a relatively low peak voltage reaches the predetermined reference voltage V0 at a moment t2 following the moment t1 by a time interval d1. In this way, the detected moment of the reception of an echo pulse is delayed from the true moment thereof. In addition, the delay time lengthens as the intensity of the echo pulse decreases.

A second prior-art distance measuring apparatus disclosed in Japanese published unexamined patent application 3-65678 is similar to the first prior-art distance measuring apparatus except for design changes indicated hereinafter.

Figure 2:
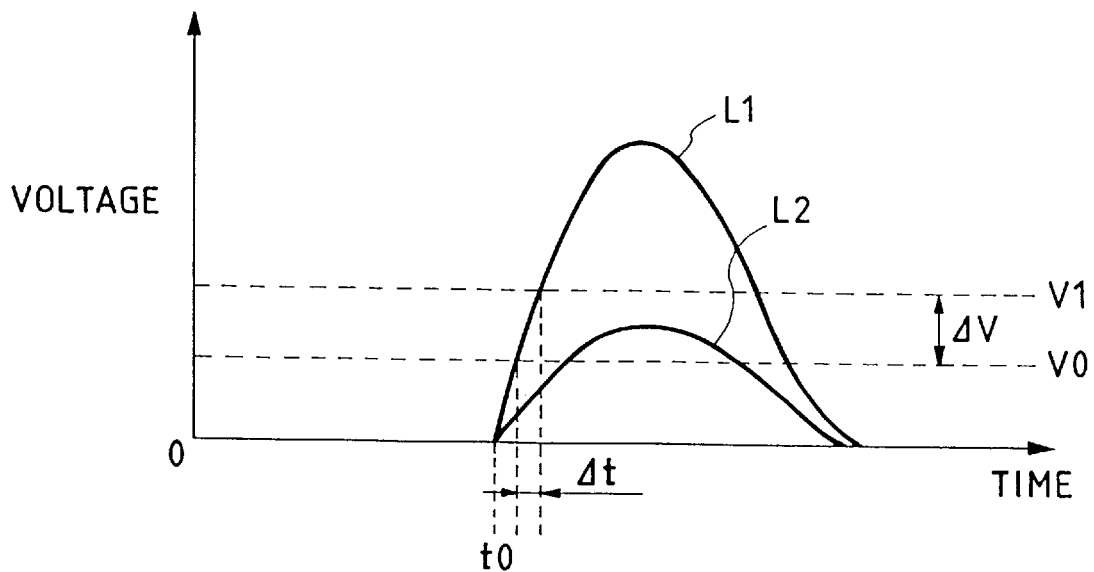
FIG. 2 is a time-domain diagram of examples of a voltage of an electric signal in a second prior-art distance measuring apparatus.

The second prior-art distance measuring apparatus includes first and second comparators subjected to predetermined reference voltages (predetermined threshold voltages) V0 and V1, respectively. As shown in FIG. 2, the predetermined reference voltage V1 is higher than the predetermined reference voltage V0 by a given value $\Delta V$. Thus, the given value $\Delta V$ is equal to the difference between the predetermined reference voltages V0 and V1. The first comparator detects the moment at which the voltage of a received-echo-corresponding electric signal reaches the predetermined lower reference voltage V0. The second comparator detects the moment at which the voltage of the received-echo-corresponding electric signal reaches the predetermined higher reference voltage V1.

In FIG. 2, "L1" denotes a time-domain variation in the voltage of the electric signal which corresponds to a received echo pulse having a relatively high peak intensity. In addition, "L2" denotes a time-domain variation in the voltage of the electric signal which corresponds to a received echo pulse having a relatively low peak intensity.

With reference to FIG. 2, the second prior-art distance measuring apparatus detects the time difference (the time interval) $\Delta t$ between the moments detected by the first and second comparators. In addition, the second prior-art distance measuring apparatus calculates a value "$\Delta V/\Delta t$" equal to the voltage difference $\Delta V$ divided by the time difference $\Delta t$. The calculated value "$\Delta V/\Delta t$" corresponds to a differential value or a differential coefficient of the voltage of the electric signal. The second prior-art distance measuring apparatus calculates the true moment t0 of the reception of the echo pulse on the basis of the differential value "$\Delta V/\Delta t$".

In the case where the calculation of the differential value "$\Delta V/\Delta t$" is implemented by digital signal processing, the difference $\Delta V$ between the predetermined reference voltages V0 and V1 is generally set to a value great enough to avoid an adverse influence of quantization errors. Also, it is desirable to set the voltage difference $\Delta V$ to a great value to avoid an adverse influence of noise.

With reference to FIG. 2, the electric signal L1 which has a relatively high peak voltage can reach both the predetermined reference voltages V0 and V1. On the other hand, the electric signal L2 which has a relatively low peak voltage can reach the predetermined lower reference voltage V0 only. The electric signal L2 fails to reach the predetermined higher reference voltage V1. Therefore, the second prior-art distance measuring apparatus can not normally operate on the electric signal L2 having a relatively low peak voltage.

First Embodiment

Figure 3:
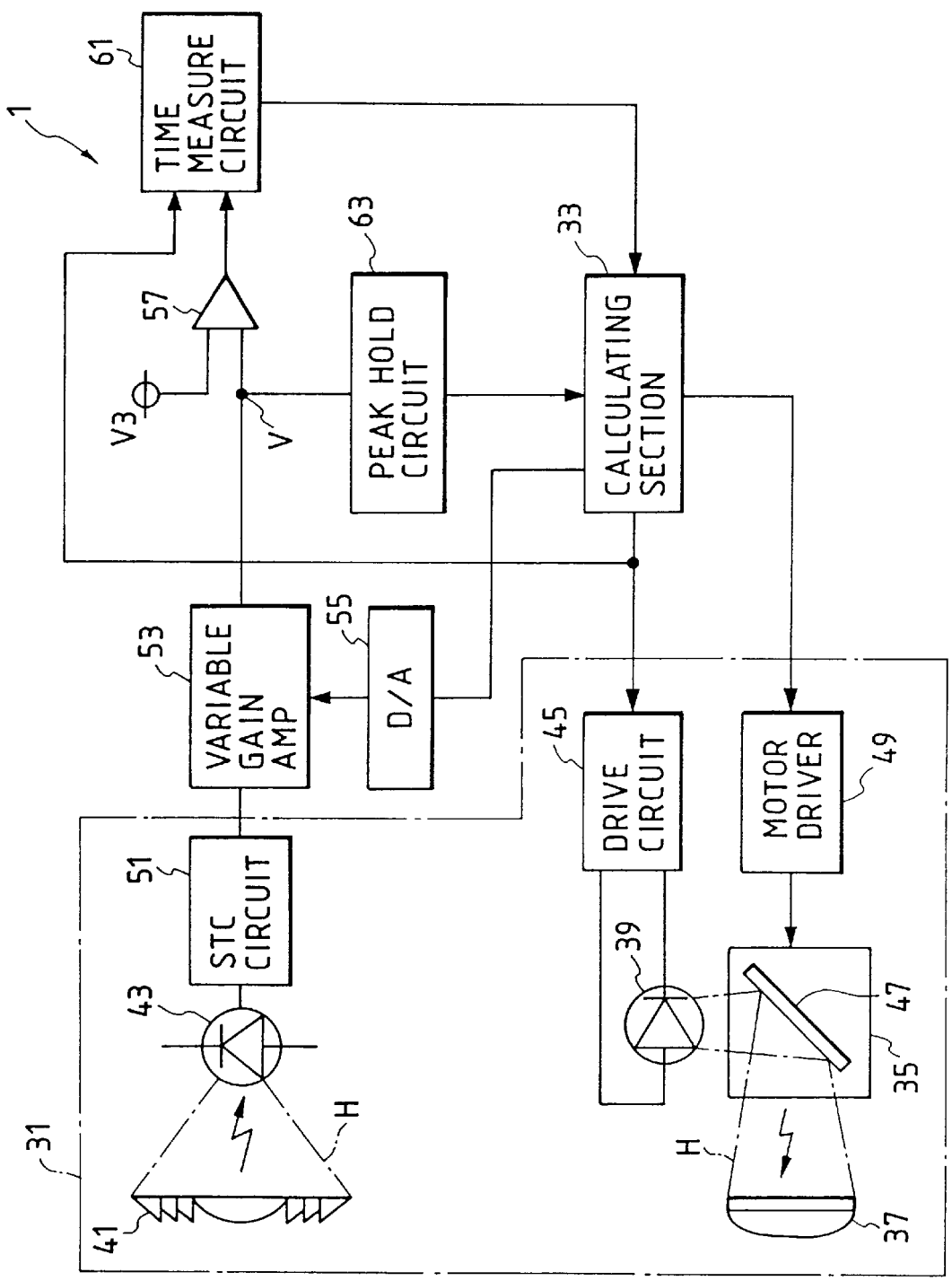
FIG. 3 is a block diagram of a distance measuring apparatus according to a first embodiment of this invention.

FIG. 3 shows a distance measuring apparatus 1 according to a first embodiment of this invention. The distance measuring apparatus 1 of FIG. 3 can be used as a part of an obstacle recognition system for an automotive vehicle.

With reference to FIG. 3, the distance measuring apparatus 1 includes a transmitting and receiving section 31 and a calculating section 33. The transmitting and receiving section 31 has a scan mirror arrangement 35, a light transmitting lens 37, a semiconductor laser diode 39, a condenser lens (a light receiving lens) 41, and a photodetector or a photosensor 43.

The laser diode 39 serves to emit pulses of a forward laser light beam H toward the scan mirror arrangement 35. The forward laser light beam H is reflected or deflected by the scan mirror arrangement 35 before being emitted via the light transmitting lens 37 into a given angular range in front of, for example, a subject vehicle. An obstacle or an object (not shown) exposed to the forward laser light beam H causes an echo light beam or a reflected light beam H. The reflected light beam H is guided to photodetector 43 via the light receiving lens 41. The photodetector 43 outputs a signal having a voltage depending on the intensity of the received light beam H.

The laser diode 39 is connected to the calculating section 33 via a drive circuit 45. The drive circuit 45 intermittently and periodically activates the laser diode 39 in response to a control signal (a drive signal) fed from the calculating section 33. The intermittent and periodical activation of the laser diode 39 results in the emission of pulses of a forward laser light beam H from the laser diode 39. The scan mirror arrangement 35 has a mirror 47 which can be swung or rotated about a shaft extending vertically with respect to the subject vehicle. The mirror 47 is actuated by a motor (not shown) powered by a motor driver 49. The mirror 47 swings or rotates in response to a control signal (a drive signal) fed to the motor driver 49 from the calculating section 33. As the mirror 47 swings or rotates and hence the angular position of the mirror 47 varies, the direction of the forward laser light beam H is changed so that a given angular range in front of the subject vehicle is scanned by the forward laser light beam H.

The output signal of the photodetector 43 is fed via a sensitivity time control circuit 51 to a variable-gain amplifier 53, being enlarged by the variable-gain amplifier 53. In general, the intensity of the received light beam H is inversely proportional to the distance to the object (or the obstacle). Accordingly, when the object (or the obstacle) has a high reflectivity and exists near the subject vehicle, the intensity of the received light beam H tends to be excessively great. The sensitivity time control circuit 51 processes the output signal of the photodetector 43 to compensate for such a great intensity of the received light beam H.

The variable-gain amplifier 53 is connected to the calculating section 33 via a D/A (digital-to-analog) converter 55. The calculating section 33 feeds the D/A converter 55 with a digital signal representing a designated gain. The D/A converter 55 changes the digital signal into a corresponding analog signal, and outputs the analog signal to the variable-gain amplifier 53. The gain of the variable-gain amplifier 53 is controlled at the designated gain represented by the output signal of the D/A converter 55. The variable-gain amplifier 53 outputs the amplification-resultant signal to a comparator 57 and a peak hold circuit 63. In addition, the comparator 57 is fed with a given threshold voltage (a predetermined reference voltage) V3. The comparator 57 compares the voltage V of the output signal of the variable-gain amplifier 53 with the given threshold voltage V3. When the voltage V of the output signal of the variable-gain amplifier 53 is higher than the given threshold voltage V3, the comparator 57 feeds a time measurement circuit 61 with a given signal (a light-reception signal) representing the reception of a reflected light beam H.

In addition, the time measurement circuit 61 is informed of the drive signal fed to the drive circuit 45 from the calculating section 33. The time measurement circuit 61 measures the difference between the moment of the occurrence of the drive signal and the moment of the occurrence of the light-reception signal. The time measurement circuit 61 outputs a signal of the measured time difference to the calculating section 33.

In the time measurement circuit 61, the drive signal is used as a start pulse PA while the light-reception signal is used as a stop pulse PB. Furthermore, the phase difference between the start pulse PA and the stop pulse PB, that is, the time difference therebetween, is encoded into a digital signal. The resultant digital signal is outputted from the time measurement circuit 61 to the calculating section 33. It is preferable that the time measurement circuit 61 can measure a small time difference. It is also preferable that if at least two light-reception signals successively occur in response to a single pulse of the forward laser light beam H, the time measurement circuit 61 can measure the time difference regarding each of the light-reception signals.

An example of the time measurement circuit 61 includes a ring oscillator having an odd number of stages. The ring oscillator has an odd number of inverter gate delay circuits connected in a ring. Each of the inverter gate delay circuits serves to invert an input signal and to output the inversion of the input signal. An electrical pulse edge is circulated through the ring. The example of the time measurement circuit 61 operates as follows. When a start pulse PA occurs, an electrical pulse edge is started to circulate through the ring. A detection is made as to which of the inverter gate delay circuits the electrical pulse edge reaches when a stop pulse PB occurs. The result of the detection represents the phase difference between the start pulse PA and the stop pulse PB.

It is preferable that the time measurement circuit 61 has the function of correcting time resolution to implement accurate time measurement. For example, the time measurement circuit 61 includes a full digital circuit being responsive to a reference signal (such as a clock signal generated by a quartz-crystal oscillator) and implementing corrective calculation on a digital basis. The time measurement circuit 61 is able to evaluate a time (a phase difference between a start pulse PA and a stop pulse PB) at a resolution remarkably higher than that of a usual clock circuit. Accordingly, even if at least two light-reception signals successively occur in response to a single pulse of the forward laser light beam H (that is, even if at least two stop pulses PB successively occur with respect to a single start pulse PA), the time measurement circuit 61 can measure the time difference regarding each of the light-reception signals.

The calculating section 33 has information of the current angular position of the mirror 47. The calculating section 33 calculates the distance between the subject vehicle and the obstacle, and the direction of the obstacle relative to the subject vehicle in response to the measured time difference and the related angular position of the mirror 47. The calculating section 33 feeds an external device (not shown) with signals (one-dimensional distance data) representing the calculated distance and the calculated direction of the obstacle.

The peak hold circuit 63 serves to hold a maximal voltage of the output signal of the variable-gain amplifier 53. The peak hold circuit 63 feeds the calculating section 33 with a signal representing the maximal voltage of the output signal of the variable-gain amplifier 53. For example, the calculating section 33 uses the maximal voltage signal in controlling the gain of the variable-gain amplifier 53.

Figure 4:
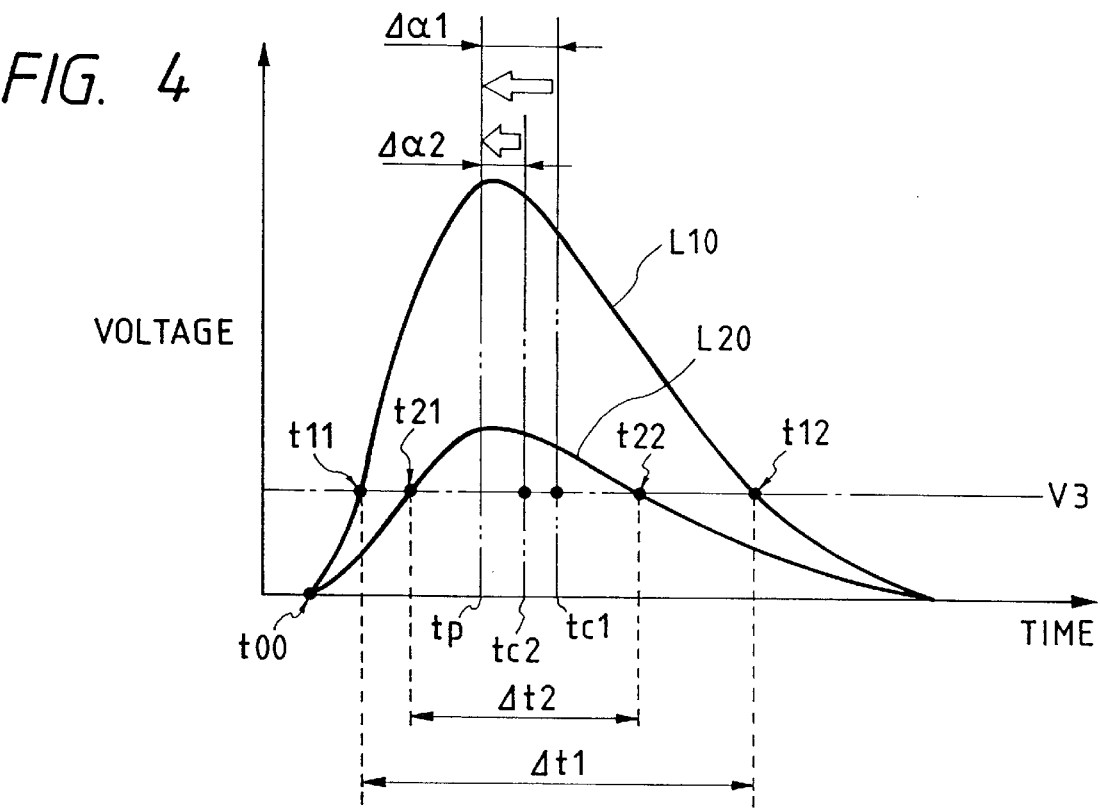
FIG. 4 is a time-domain diagram of examples of a voltage of an electric signal in the distance measuring apparatus of FIG. 3.

With reference to FIG. 4, the curve L10 denotes an example of a time-domain variation in the voltage V of the output signal of the variable-gain amplifier 53 which occurs in response to a received light beam H having a relatively high peak intensity. The curve L20 denotes an example of a time-domain variation in the voltage V of the output signal of the variable-gain amplifier 53 which occurs in response to a received light beam H having a relatively low peak intensity.

In the case of the voltage variation L10, the voltage V of the output signal of the variable-gain amplifier 53 starts to rise from "0" at a moment t00. Then, the voltage V of the output signal of the variable-gain amplifier 53 continues to rise until a subsequent moment tp. At a moment t11 between the moments t00 and tp, the voltage V of the output signal of the variable-gain amplifier 53 reaches the given threshold voltage V3 applied to the comparator 57. At the moment tp, the voltage V of the output signal of the variable-gain amplifier 53 reaches a maximum level. After the moment tp, the voltage V of the output signal of the variable-gain amplifier 53 continues to drop from the maximum level. At a moment t12 following the moment tp, the voltage V of the output signal of the variable-gain amplifier 53 reaches the given threshold voltage V3 applied to the comparator 57. The time difference (the time interval) between the moments t11 and t12 is denoted by "$\Delta t1$".

In the case of the voltage variation L20, the voltage V of the output signal of the variable-gain amplifier 53 starts to rise from "0" at a moment t00. Then, the voltage V of the output signal of the variable-gain amplifier 53 continues to rise until a subsequent moment tp. At a moment t21 between the moments t00 and tp, the voltage V of the output signal of the variable-gain amplifier 53 reaches the given threshold voltage V3 applied to the comparator 57. At the moment tp, the voltage V of the output signal of the variable-gain amplifier 53 reaches a maximum level. After the moment tp, the voltage V of the output signal of the variable-gain amplifier 53 continues to drop from the maximum level. At a moment t22 following the moment tp, the voltage V of the output signal of the variable-gain amplifier 53 reaches the given threshold voltage V3 applied to the comparator 57. The time difference (the time interval) between the moments t21 and t22 is denoted by "$\Delta t2$".

It is shown in FIG. 4 that the time difference $\Delta t1$ corresponding to the strong received light beam H is greater than the time difference $\Delta t2$ corresponding to the weak received light beam H. Thus, the time interval (for example, the time difference $\Delta t1$, or the time difference $\Delta t2$) during which the voltage V of the output signal of the variable-gain amplifier 53 remains higher than the given threshold voltage V3 depends on the peak intensity of a related received light beam H. Specifically, this time interval shortens as the peak intensity of the received light beam H drops. This time interval lengthens as the peak intensity of the received light beam H rises. Accordingly, the time interval (for example, the time difference $\Delta t1$, or the time difference $\Delta t2$) during which the voltage V of the output signal of the variable-gain amplifier 53 remains higher than the given threshold voltage V3 represents the peak intensity of a related received light beam H.

With reference to FIG. 4, the middle point between the moments t11 and t12 is denoted by "tc1", and the middle point between the moments t21 and t22 is denoted by "tc2". In addition, the time difference (the time interval) between the moments tp and tc1 is denoted by "α1", and the time difference (the time interval) between the moments tp and tc2 is denoted by "Δα2". Such a time difference (Δα1 or Δα2) is referred to as a corrective time.

Figure 5:
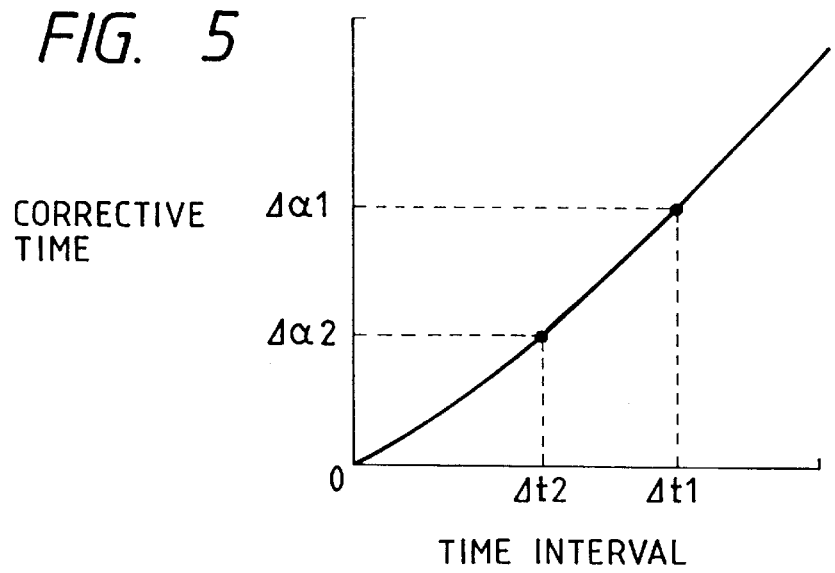
FIG. 5 is a diagram of the relation between a time interval and a corrective time in the distance measuring apparatus of FIG. 3.

There is a certain relation between the above-indicated corrective time (Δα1 or Δα2) and the above-indicated time interval (Δt1 or Δt2) representing the received light intensity. Specifically, as shown in FIG. 5, the corrective time monotonically lengthens in accordance with an increase in the intensity-representing time interval. The presence of such a relation between the corrective time and the intensity-representing time interval was experimentally confirmed. Information (map information) of the relation between the corrective time and the intensity-representing time interval is predetermined according to, for example, experiments. The predetermined information of the relation between the corrective time and the intensity-representing time interval is previously stored in a memory such as a ROM within the calculating section 33.

According to the first embodiment of this invention, the corrective time is calculated from the intensity-representing time interval by referring to the map information of the relation therebetween. The moment tp, at which the voltage V of the output signal of the variable-gain amplifier 53 peaks, is estimated by correcting the middle point (tc1 or tc2) in response to the calculated corrective time. It should be noted that as shown in FIG. 4, the peak moment tp precedes the middle point (tc1 or tc2) by the corrective time (Δα1 or Δα2). The distance between the subject vehicle and the obstacle is calculated on the basis of the time difference (the time interval) between the moment of emission of pulse light from the laser diode 39 and the estimated moment tp at which the voltage V of the output signal of the variable-gain amplifier 53 peaks.

The corrective time compensates for an error in the distance measurement which would be caused by a change in the peak intensity of a received light beam H. An equal peak point tp is decided independent of the peak intensity of a received light beam H, and the distance in question is calculated on the basis of the time difference (the time interval) between the light-pulse emission moment and the decided peak moment tp.

Figure 6:
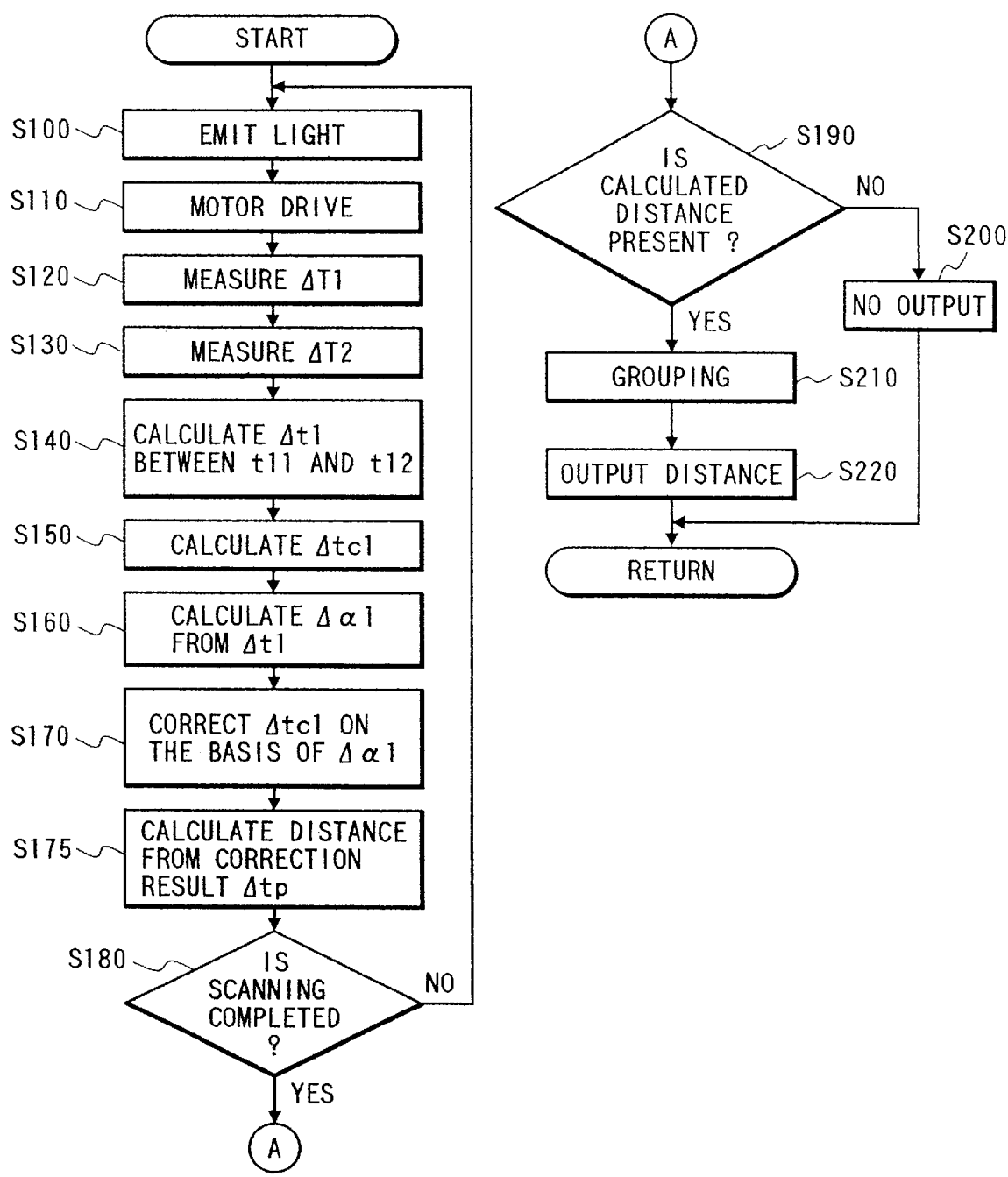
FIG. 6 is a flowchart of a segment of a program for controlling a calculating section in FIG. 3.

The calculating section 33 includes a microcomputer or a similar device having a combination of an I/O port, a ROM, a RAM, and a CPU. The calculating section 33 operates in accordance with a control program stored in the ROM. FIG. 6 is a flowchart of a segment of this control program. The program segment in FIG. 6 is reiterated at a given period.

With reference to FIG. 6, a first step S100 of the program segment outputs a start pulse PA to the drive circuit 45 and the time measurement circuit 61. For the drive circuit 45, the start pulse PA corresponds to a control signal or a drive signal. The drive circuit 45 activates the laser diode 39 in response to the start pulse PA. As a result, the laser diode 39 emits a pulse of a forward laser light beam H.

A step S110 following the step S100 controls the motor driver 49 so that the angular position of the mirror 47 will vary by a predetermined unit angle. Iterative execution of the step S110 enables a given angular range in front of the subject vehicle to be scanned by the forward laser light beam H.

A step S120 subsequent to the step S110 derives information of the time difference (the time interval) ΔT1 from the output signal of the time measurement circuit 61. When the voltage V of the output signal of the variable-gain amplifier 53 is higher than the given threshold voltage V3, the comparator 57 outputs a high-level signal to the time measurement circuit 61. Otherwise, the comparator 57 outputs a low-level signal to the time measurement circuit 61. The output signal of the comparator 57 which is in the high-level sate corresponds to a stop pulse PB. The time measurement circuit 61 detects the time interval between the moment of the trailing edge of the start pulse PA and the moment of the leading edge of the stop pulse PB, and also the time interval between the moment of the trailing edge of the start pulse PA and the moment of the trailing edge of the stop pulse PB. The time difference ΔT1 is equal to the time interval between the moment of the trailing edge of the start pulse PA and the moment of the leading edge of the stop pulse PB.

A step S130 following the step S120 derives information of the time difference (the time interval) ΔT2 from the output signal of the time measurement circuit 61. The time difference ΔT2 is equal to the time interval between the moment of the trailing edge of the start pulse PA and the moment of the trailing edge of the stop pulse PB.

A step S140 subsequent to the step S130 calculates the intensity-representing time interval Δt1 (or Δt2) from the time differences ΔT1 and ΔT2 according to the following equation.

$$\Delta t1 = \Delta T2 - \Delta T1 \tag{1}$$

A step S150 following the step S140 calculates the time interval Δtc1 (or Δtc2) between the moment of the trailing edge of the start pulse PA and the middle point tc1 (or tc2) from the time differences ΔT1 and ΔT2 according to the following equation.

$$\Delta tc1 = (\Delta T2 + \Delta T1)/2 \tag{2}$$

A step S160 subsequent to the step S150 calculates the corrective time Δα1 (or Δα2) from the intensity-representing time interval Δt1 (or Δt2) by referring to the map in FIG. 5.

A step S170 following the step S160 corrects the time interval Δtc1 (or Δtc2) in accordance with the corrective time Δα1 (or Δα2), and thereby calculates the time difference Δtp between the moment of the trailing edge of the start pulse PA and the moment tp at which the voltage V of the output signal of the variable-gain amplifier 53 peaks. Specifically, the calculation of the time difference Δtp is carried out by referring to the following equation.

$$\Delta tp = \Delta tc1 - \Delta \alpha 1 \tag{3}$$

A step S175 subsequent to the step S170 calculates the distance to the object causing the reflected light beam H on the basis of the time difference Δtp. Specifically, the distance in question is given as being equal to the time difference Δtp multiplied by "c/2" where "c" denotes the speed of light.

A step S180 following the step S175 decides whether or not the given angular range in front of the subject vehicle has been scanned by the forward laser light beam H, that is, whether or not the angular position of the mirror 47 has reached a given end position. According to a first example, the decision by the step S180 is carried out in response to the information of the control of the motor driver 49. According to a second example, the decision by the step S180 is carried out by counting the number of times of execution of the step S110, and by comparing the counted number of times with a predetermined reference number of times. When the given angular range in front of the subject vehicle has been scanned by the forward laser light beam H, the program advances from the step S180 to a step S190. Otherwise, the program returns from the step S180 to the step S100. Accordingly, the sequence of the steps S100, S110, S120, S130, S140, S150, S160, S170, S175, and S180 continues to be periodically repeated until the given angular range in front of the subject vehicle has been scanned by the forward laser light beam H.

The step S190 decides whether or not at least one data piece of the calculated distance is present. When at least one data piece of the calculated distance is present, the program advances from the step S190 to a step S210. Otherwise, the program advances from the step S190 to a step S200.

The step S200 stores information of the absence of any data piece of the calculated distance. The step S200 does not output any data piece of the calculated distance to an external device. After the step S200, the current execution cycle of the program segment ends and then the program returns to a main routine.

When a plurality of data pieces of the calculated distances are present, the step S210 separates the data pieces into a group or groups according to the calculated distances represented thereby. When only a single data piece of the calculated distance is present, the step S210 does not execute the grouping.

A step S220 following the step S210 outputs the data piece of the calculated distance or the data pieces of the calculated distances in the respective groups (or the group) to the external device. After the step S220, the current execution cycle of the program segment ends and then the program returns to a main routine.

The laser diode 39 emits a pulse of a forward laser light beam H each time the angular position of the mirror 47 is changed by the predetermined unit angle. Therefore, the direction of the forward laser light beam H periodically changes angular step by angular step. For example, every angular step corresponds to an angle of 0.5 degree. The data pieces of the calculated distances are associated with the related directions of the forward laser light beam H, respectively. According to the operation of the step S210, data pieces of calculated distances being close to each other and being associated with close directions of the forward laser light beam H are placed into a common group. The grouping by the step S210 prevents data pieces of calculated distances, which are caused by a same obstacle (object), from being handled as indicating different obstacles (objects).

The correction based on the relation between the intensity-representing time interval ($\Delta t1$ or $\Delta t2$) and the corrective time ($\Delta \alpha 1$ or $\Delta \alpha 2$) enables the end of the finally-calculated time interval $\Delta tp$ to be coincident with the peak moment tp independent of the peak intensity of a received light beam H. Accordingly, it is possible to prevent the occurrence of an error in the distance measurement which would be caused by a change in the peak intensity of a received light beam H.

With reference back to FIG. 4, the middle point tc1 is defined in the intensity-representing time interval $\Delta t1$ between the moments t11 and t12. The corrective time $\Delta \alpha 1$ is used as an indication of an error (a time difference) between the peak moment tp and the middle point tc1. The step S160 in FIG. 6 calculates the corrective time $\Delta \alpha 1$ from the intensity-representing time interval $\Delta t1$. The step S150 in FIG. 6 calculates the time interval $\Delta tc1$ by averaging the time differences (the time intervals) $\Delta T1$ and $\Delta T2$. The end of the time interval $\Delta tc1$ coincides with the middle point tc1.

The end of the time difference $\Delta T1$ coincides with the moment t11. The end of the time difference $\Delta T2$ coincides with the moment t12. Accordingly, errors in the time differences $\Delta T1$ and $\Delta T2$ are also averaged so that a higher accuracy of the distance measurement is available.

Figure 7:
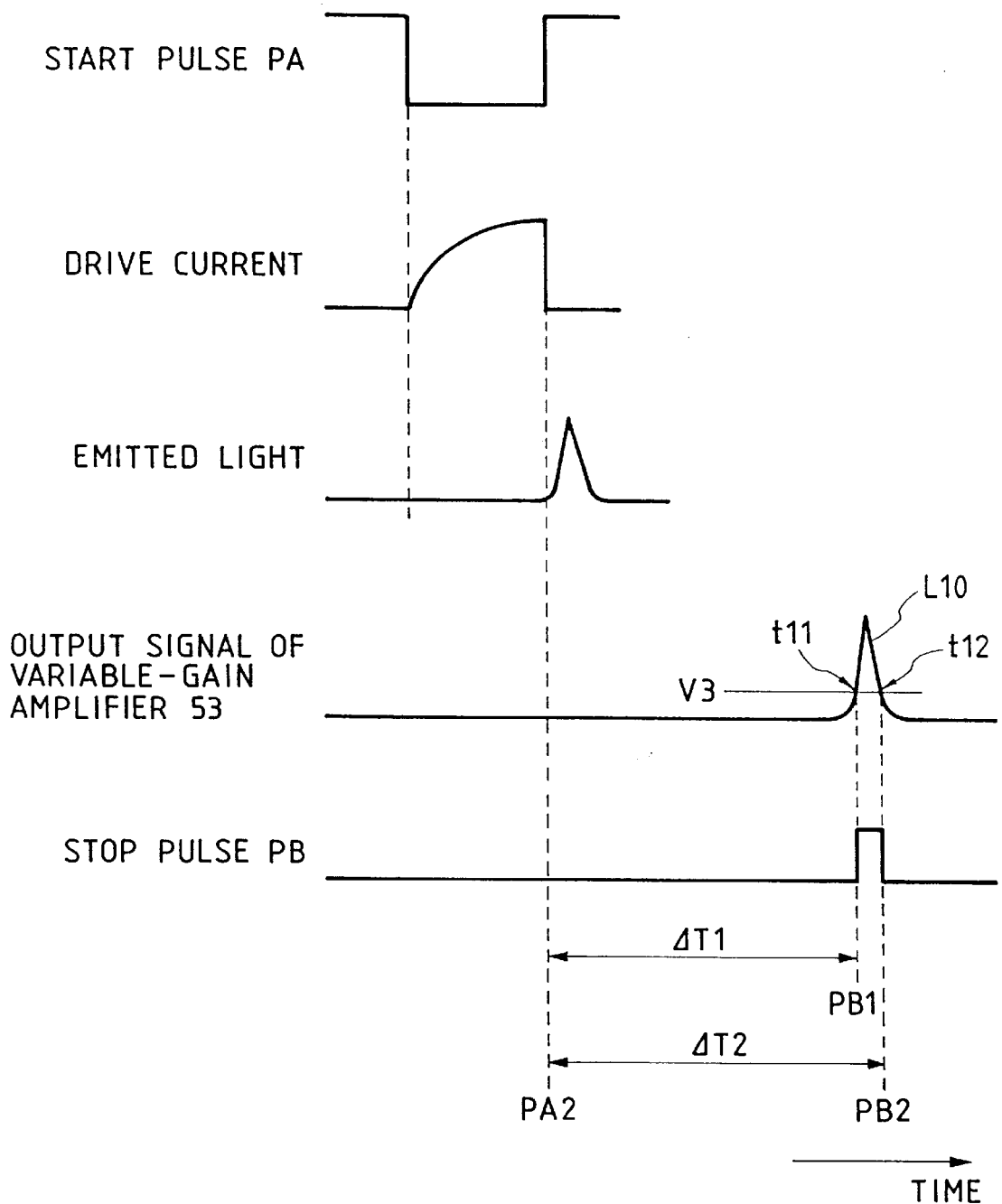
FIG. 7 is a time-domain diagram of various signals in the distance measuring apparatus of FIG. 3.

With reference to FIG. 7, the start pulse PA is of the negative type. The drive circuit 45 generates a first-order drive current in response to the start pulse PA. The drive circuit 45 feeds the drive current to the laser diode 39. The laser diode 39 is activated by the drive current. As a result, the laser diode 39 emits a pulse of the forward light beam H at a moment substantially the same as or immediately following the moment PA2 of the trailing edge of the start pulse PA. At a later moment t11, the voltage V of the output signal of the variable-gain amplifier 53 rises across the given threshold voltage V3 so that the stop pulse PB starts to occur. At a subsequent moment t12, the voltage V of the output signal of the variable-gain amplifier 53 drops across the given threshold voltage V3 so that the stop pulse PB ends. The time measurement circuit 61 measures the time interval $\Delta T1$ between the moment PA2 of the trailing edge of the start pulse PA and the moment PB1 of the leading edge of the stop pulse PB. Also, the time measurement circuit 61 measures the time interval $\Delta T2$ between the moment PA2 of the trailing edge of the start pulse PA and the moment PB2 of the tailing edge of the stop pulse PB.

Second Embodiment

Figure 8:
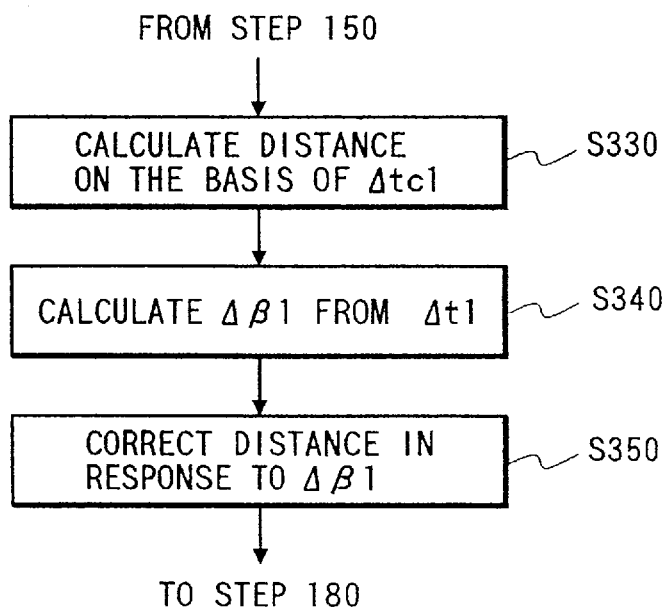
FIG. 8 is a flowchart of a portion of a control program in a distance measuring apparatus according to a second embodiment of this invention.

A second embodiment of this invention is similar to the first embodiment thereof except for design changes indicated hereinafter. With reference to FIG. 8, the second embodiment of this invention includes steps S330, S340, and S350 instead of the steps S160, 3170, and S175 in FIG. 6.

The step S330 in FIG. 8 follows the step S150 in FIG. 6. The step S330 calculates a first distance to the object causing the reflected light beam H on the basis of the time difference $\Delta tc1$ between the moment of the trailing edge of the start pulse PA and the middle point tc1. Specifically, the first distance in question is given as being equal to the time difference $\Delta tc1$ multiplied by "c/2" where "c" denotes the speed of light.

Figure 9:
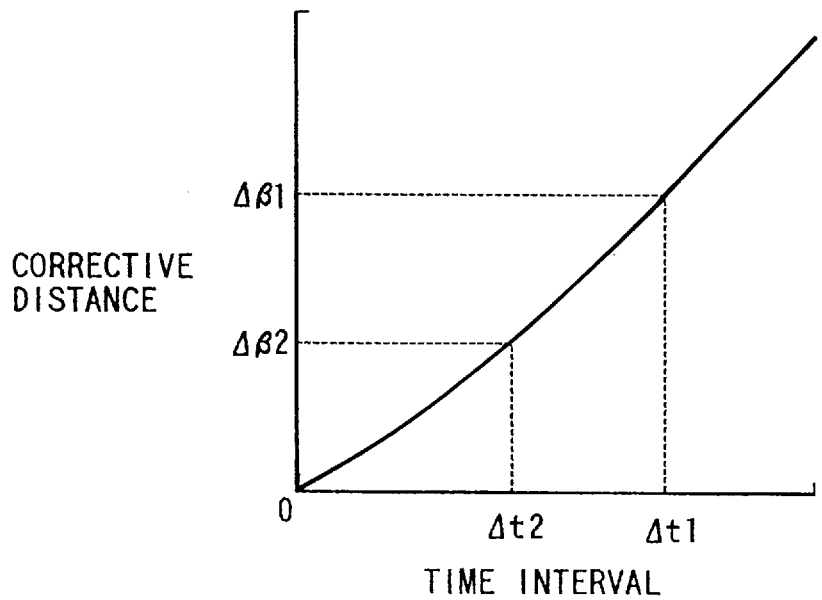
FIG. 9 is a diagram of the relation between a time interval and a corrective distance in the distance measuring apparatus according to the second embodiment of this invention.

The step S340 follows the step S330. The step S340 calculates a corrective distance $\Delta \beta 1$ (or $\Delta \beta 2$) from the intensity-representing time interval $\Delta t1$ (or $\Delta t2$) by referring to map information in FIG. 9 which indicates a certain relation therebetween. As shown in FIG. 9, the corrective distance $\Delta \beta 1$ (or $\Delta \beta 2$) increases in accordance with an increase in the intensity-representing time interval $\Delta t1$ (or $\Delta t2$).

The step S350 follows the step S340. The step S350 corrects the first distance into a second distance in response to the corrective distance $\Delta \beta 1$ (or $\Delta \beta 2$). After the step S350, the program advances to the step S180 in FIG. 6. The second distance provided by the step S350 is used instead of the distance calculated by the step S175 in FIG. 6.

Third Embodiment

A third embodiment of this invention is similar to the first embodiment thereof except for design changes indicated hereinafter.

Figure 10:
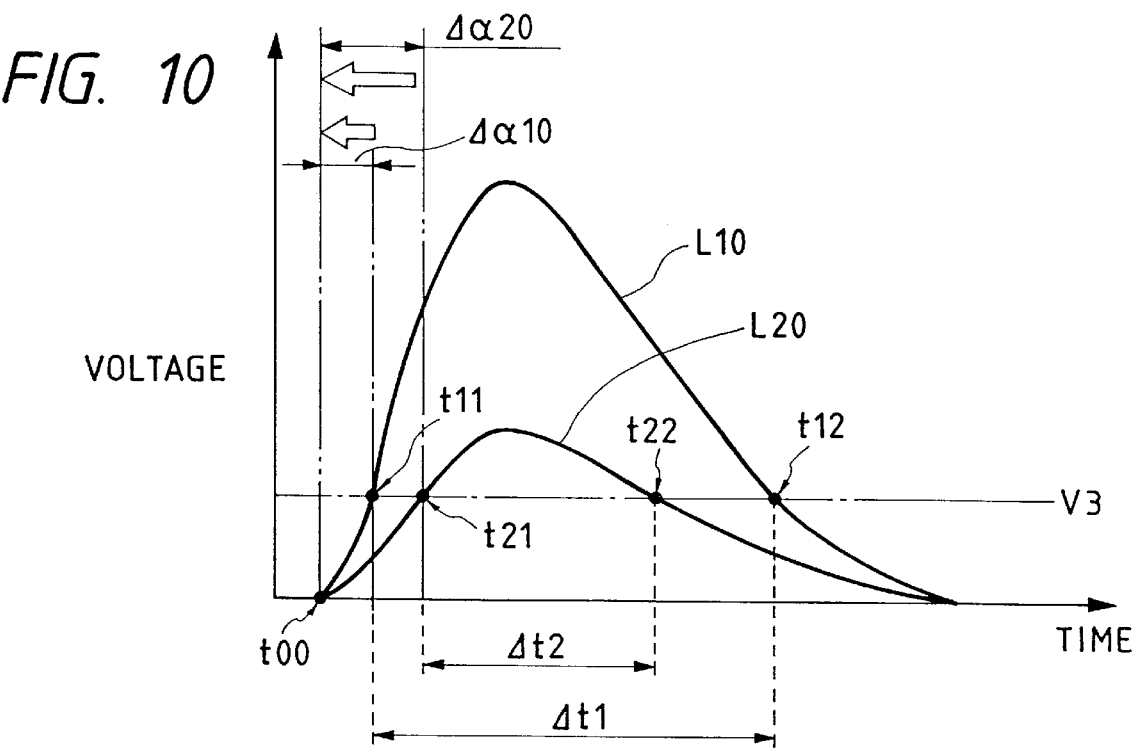
FIG. 10 is a time-domain diagram of examples of a voltage of an electric signal in a distance measuring apparatus according to a third embodiment of this invention.

With reference to FIG. 10, the curve L10 denotes an example of a time-domain variation in the voltage V of the output signal of the variable-gain amplifier 53 (see FIG. 3) which occurs in response to a received light beam H having a relatively high peak intensity. The curve L20 denotes an example of a time-domain variation in the voltage V of the output signal of the variable-gain amplifier 53 which occurs in response to a received light beam H having a relatively low peak intensity.

In the case of the voltage variation L10, the voltage V of the output signal of the variable-gain amplifier 53 (see FIG. 3) starts to rise from "0" at a moment t00. Then, the voltage V of the output signal of the variable-gain amplifier 53 continues to rise. At a moment t11 following the moment t00, the voltage V of the output signal of the variable-gain amplifier 53 reaches the given threshold voltage V3 applied to the comparator 57 (see FIG. 3). After the moment t11, the voltage V of the output signal of the variable-gain amplifier 53 increases and then reaches a maximum level. Subsequently, the voltage V of the output signal of the variable-gain amplifier 53 continues to drop from the maximum level. At a moment t12 following the moment t11, the voltage V of the output signal of the variable-gain amplifier 53 reaches the given threshold voltage V3 applied to the comparator 57. The time difference (the time interval) between the moments t11 and t12 is denoted by "$\Delta t1$".

In the case of the voltage variation L20, the voltage V of the output signal of the variable-gain amplifier 53 (see FIG. 3) starts to rise from "0" at a moment t00. Then, the voltage V of the output signal of the variable-gain amplifier 53 continues to rise. At a moment t21 following the moment t00, the voltage V of the output signal of the variable-gain amplifier 53 reaches the given threshold voltage V3 applied to the comparator 57 (see FIG. 3). After the moment t21, the voltage V of the output signal of the variable-gain amplifier 53 increases and then reaches a maximum level. Subsequently, the voltage V of the output signal of the variable-gain amplifier 53 continues to drop from the maximum level. At a moment t22 following the moment t21, the voltage V of the output signal of the variable-gain amplifier 53 reaches the given threshold voltage V3 applied to the comparator 57. The time difference (the time interval) between the moments t21 and t22 is denoted by "$\Delta t2$".

It is shown in FIG. 10 that the time difference $\Delta t1$ corresponding to the strong received light beam H is greater than the time difference $\Delta t2$ corresponding to the weak received light beam H. Thus, the time interval (for example, the time difference $\Delta t1$, or the time difference $\Delta t2$) during which the voltage V of the output signal of the variable-gain amplifier 53 remains higher than the given threshold voltage V3 depends on the peak intensity of a related received light beam H. Specifically, this time interval shortens as the peak intensity of the received light beam H drops. This time interval lengthens as the peak intensity of the received light beam H rises. Accordingly, the time interval (for example, the time difference $\Delta t1$, or the time difference $\Delta t2$) during which the voltage V of the output signal of the variable-gain amplifier 53 remains higher than the given threshold voltage V3 represents the peak intensity of a related received light beam H.

With reference to FIG. 10, the time difference (the time interval) between the moments t00 and t12 is denoted by "$\Delta \alpha 10$". In addition, the time difference (the time interval) between the moments t00 and t22 is denoted by "$\Delta \alpha 20$". Such a time difference ($\Delta \alpha 10$ or $\Delta \alpha 20$) is referred to as a corrective time.

There is a certain relation between the above-indicated corrective time ($\Delta \alpha 10$ or $\Delta \alpha 20$) and the above-indicated time interval ($\Delta t1$ or $\Delta t2$) representing the received light intensity.

Figure 11:
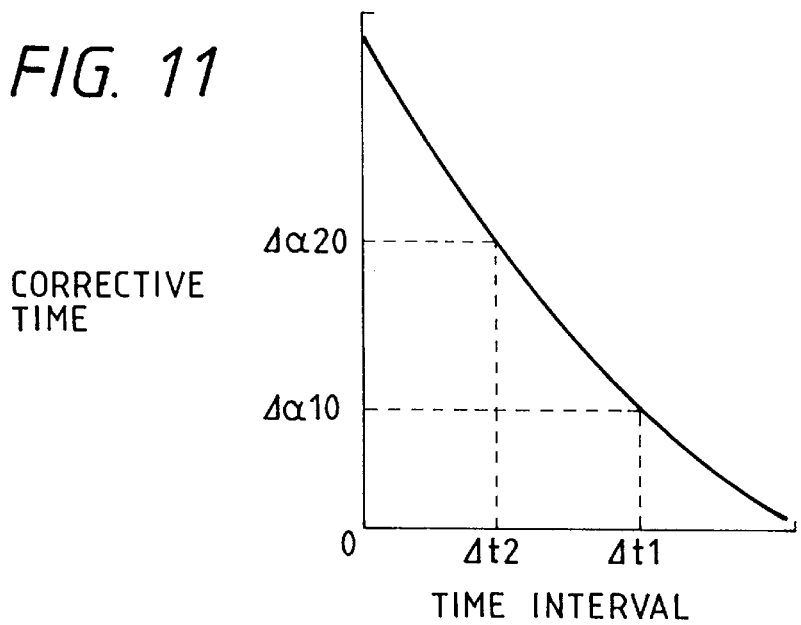
FIG. 11 is a diagram of the relation between a time interval and a corrective time in the distance measuring apparatus according to the third embodiment of this invention.

Specifically, as shown in FIG. 11, the corrective time monotonically shortens in accordance with an increase in the intensity-representing time interval. The presence of such a relation between the corrective time and the intensity-representing time interval was experimentally confirmed. Information (map information) of the relation between the corrective time and the intensity-representing time interval is predetermined according to, for example, experiments. The predetermined information of the relation between the corrective time and the intensity-representing time interval is previously stored in a memory such as a ROM within the calculating section 33 (see FIG. 3).

According to the third embodiment of this invention, the corrective time is calculated from the intensity-representing time interval by referring to the relation therebetween. As previously explained, at the moment t00, the voltage V of the output signal of the variable-gain amplifier 53 starts to rise from "0". Such a moment (t00) is referred to as a rise starting moment. As previously explained, at the moment t11 or t21 following the rise starting moment t00, the voltage V of the output signal of the variable-gain amplifier 53 reaches the given threshold voltage V3 applied to the comparator 57. Such a moment (t11 or t21) is referred to as a threshold reaching moment. The rise starting moment t00 is estimated by correcting the threshold reaching moment (t11 or t21) in accordance with the calculated corrective time. It should be noted that as shown in FIG. 10, the rise starting moment t00 precedes the threshold reaching moment (t11 or t12) by the corrective time ($\Delta \alpha 10$ or $\Delta \alpha 20$). The distance between the subject vehicle and the obstacle is calculated on the basis of the time difference (the time interval) between the moment of emission of pulse light from the laser diode 39 (see FIG. 3) and the estimated rise starting moment t00.

The corrective time compensates for an error in the distance measurement which would be caused by a change in the peak intensity of a received light beam H. An equal rise starting moment t00 is decided independent of the peak intensity of a received light beam H, and the distance in question is calculated on the basis of the time difference (the time interval) between the light-pulse emission moment and the rise starting moment t00.

Figure 12:
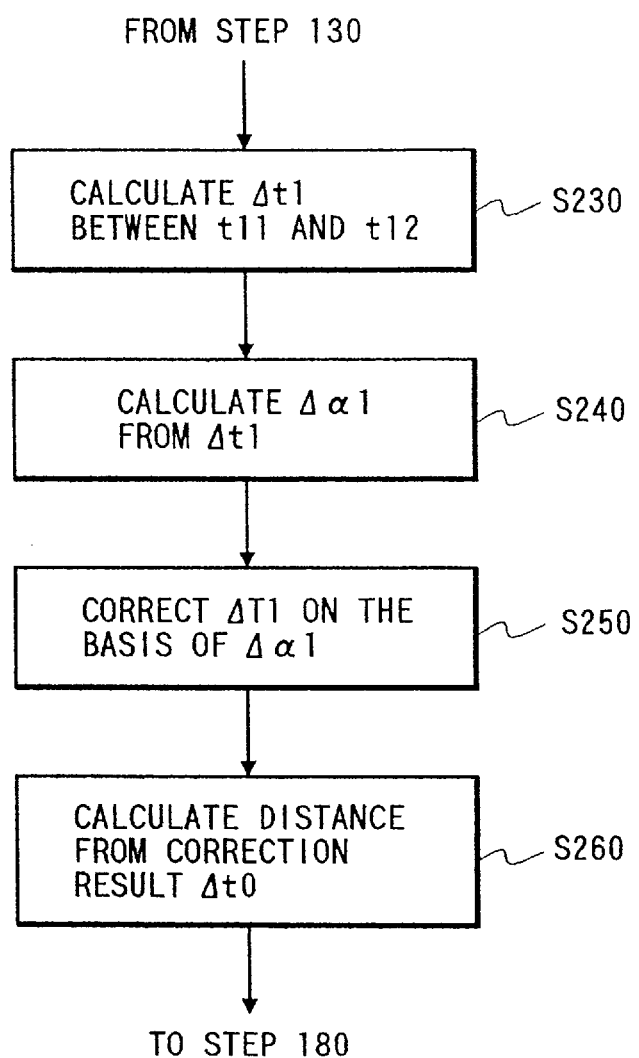
FIG. 12 is a flowchart of a portion of a control program in the distance measuring apparatus according to the third embodiment of this invention.

With reference to FIG. 12, the third embodiment of this invention includes steps S230, S240, S250, and S260 instead of the steps S140, S150, S160, S170, and S175 in FIG. 6.

The step S230 in FIG. 12 follows the step S130 in FIG. 6. The step S230 calculates the intensity-representing time interval $\Delta t1$ (or $\Delta t2$) from the time differences $\Delta T1$ and $\Delta T2$ according to the previously-indicated equation (1).

The step S240 follows the step S230. The step S240 calculates the corrective time $\Delta \alpha 10$ (or $\alpha 20$) from the intensity-representing time interval $\Delta t1$ (or $\Delta t2$) by referring to the map in FIG. 11.

The step S250 follows the step S240. The step S250 corrects the time interval $\Delta T1$ in accordance with the corrective time $\Delta \alpha 10$ (or $\Delta \alpha 20$), and thereby calculates the time difference $\Delta t00$ between the moment PA2 of the trailing edge of the start pulse PA and the moment (the rise starting moment) t00 at which the voltage V of the output signal of the variable-gain amplifier 53 starts to rise from "0". Specifically, the calculation of the time difference $\Delta t00$ is carried out by referring to the following equation.

$$\Delta t00 = \Delta T1 - \Delta \alpha 10 \tag{4}$$

The step S260 follows the step S250. The step S260 calculates the distance to the object causing the reflected light beam H on the basis of the time difference $\Delta t00$. Specifically, the distance in question is given as being equal to the time difference $\Delta t00$ multiplied by "c/2" where "c"

denotes the speed of light. After the step S260, the program advances to the step S180 in FIG. 6.

The correction based on the relation between the intensity-representing time interval (Δt1 or Δt2) and the corrective time (Δα10 or Δα20) enables the end of the finally-calculated time interval Δt00 to be coincident with the rise starting moment t00 independent of the peak intensity of a received light beam H. Accordingly, it is possible to prevent the occurrence of an error in the distance measurement which would be caused by a change in the peak intensity of a received light beam H.

It should be noted that the time difference ΔT2 may be corrected instead of the time difference ΔT1.

According to a modification of the third embodiment of this invention, the distance to the object causing the reflected light beam H is calculated on the basis of the time difference ΔT1, and then the calculated distance is corrected as in the second embodiment of this invention.

Fourth Embodiment

A fourth embodiment of this invention is similar to the first embodiment thereof except for design changes indicated hereinafter.

Figure 13:
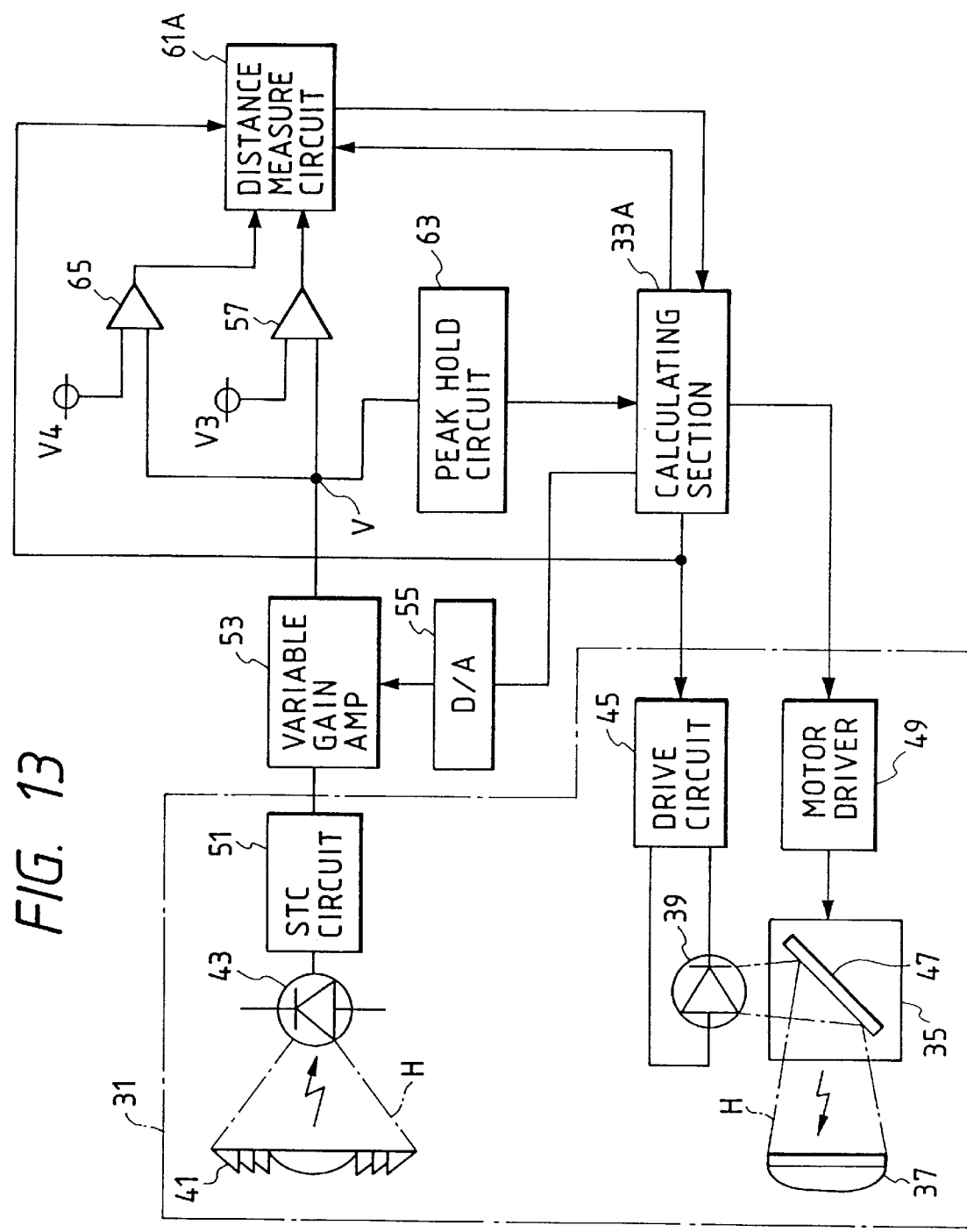
FIG. 13 is a block diagram of a distance measuring apparatus according to a fourth embodiment of this invention.

With reference to FIG. 13, the fourth embodiment of this invention includes a calculating section 33A and a time measurement circuit 61A instead of the calculating section 33 and the time measurement circuit 61 in FIG. 3. The fourth embodiment of this invention further includes a comparator 65.

A first input terminal of the comparator 65 receives the output signal of the variable-gain amplifier 53. A second input terminal of the comparator 65 receives a given threshold voltage (a predetermined reference voltage) V4. The given threshold voltage V4 is higher than the given threshold voltage V3 applied to the comparator 57. The comparator 65 compares the voltage V of the output signal of the variable-gain amplifier 53 with the given threshold voltage V4. When the voltage V of the output signal of the variable-gain amplifier 53 is higher than the given threshold voltage V4, the comparator 65 feeds the time measurement circuit 61A with a given signal (a light-reception signal) representing the reception of a reflected light beam H.

Figure 14:
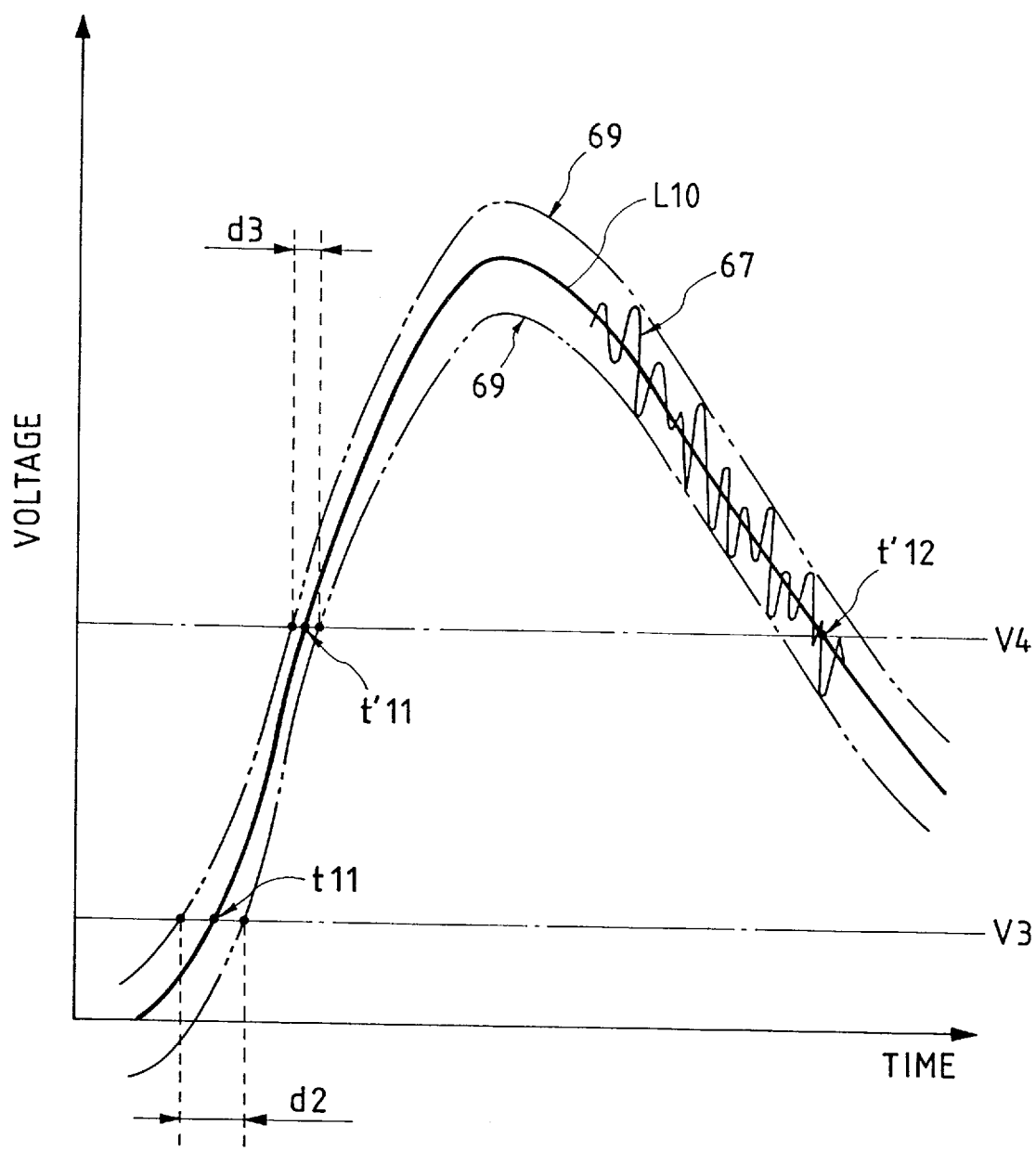
FIG. 14 is a time-domain diagram of an example of a voltage of an electric signal in the distance measuring apparatus of FIG. 13.

With reference to FIG. 14, the curve L10 denotes an example of a time-domain variation in the voltage V of the output signal of the variable-gain amplifier 53 (see FIG. 13) which occurs in response to a received light beam H having a peak intensity. High-frequency noise 67 tends to be superimposed on the signal voltage L10 represented by the output signal of the variable-gain amplifier 53. Accordingly, the noise-added signal voltage has a fluctuation width defined by an envelope 69. The fluctuation width would cause errors in the time interval Δt1 (or Δt2) and the time differences ΔT1 and ΔT2.

Regarding the voltage variation L10, the voltage V of the output signal of the variable-gain amplifier 53 (see FIG. 13) increases across the given threshold voltage V3 at a moment t11. Then, the voltage V of the output signal of the variable-gain amplifier 53 increases across the given threshold voltage V4 at a moment t'11.

Subsequently, the voltage V of the output signal of the variable-gain amplifier 53 drops across the given threshold voltage V4 at a moment t'12.

With reference to FIG. 14, the previously-indicated fluctuation width corresponds to a time value d2 at the moment t11. In addition, the previously-indicated fluctuation width corresponds to a time value d3 at the moment t'11. Since the increasing slope of the signal voltage L10 available at the moment t'11 is greater than that available at the moment t11, the fluctuation time width d3 is smaller than the fluctuation time width d2. Accordingly, the time interval ΔT'1 between the moment of the trailing edge of the start pulse PA and the moment t'11 is less affected by noise than the time interval ΔT1 between the moment of the trailing edge of the start pulse PA and the moment t11 is. Thus, using the time interval ΔT'1 instead of the time interval ΔT1 reduces the influence of noise on the distance measurement.

In the case of a received light beam H having a peak intensity which is high such that the voltage V of the output signal of the variable-gain amplifier 53 exceeds the given threshold voltage V4, calculation is given of the time interval ΔT'1 between the moment of the trailing edge of the start pulse PA and the moment t'11 at which the voltage V of the output signal of the variable-gain amplifier 53 increases across the given threshold voltage V4. In the case of a received light beam H having a peak intensity which is low such that the voltage V of the output signal of the variable-gain amplifier 53 does not exceed the given threshold voltage V4, calculation is given of the time interval ΔT1 between the moment of the trailing edge of the start pulse PA and the moment t11 at which the voltage V of the output signal of the variable-gain amplifier 53 increases across the given threshold voltage V3.

Figure 15:
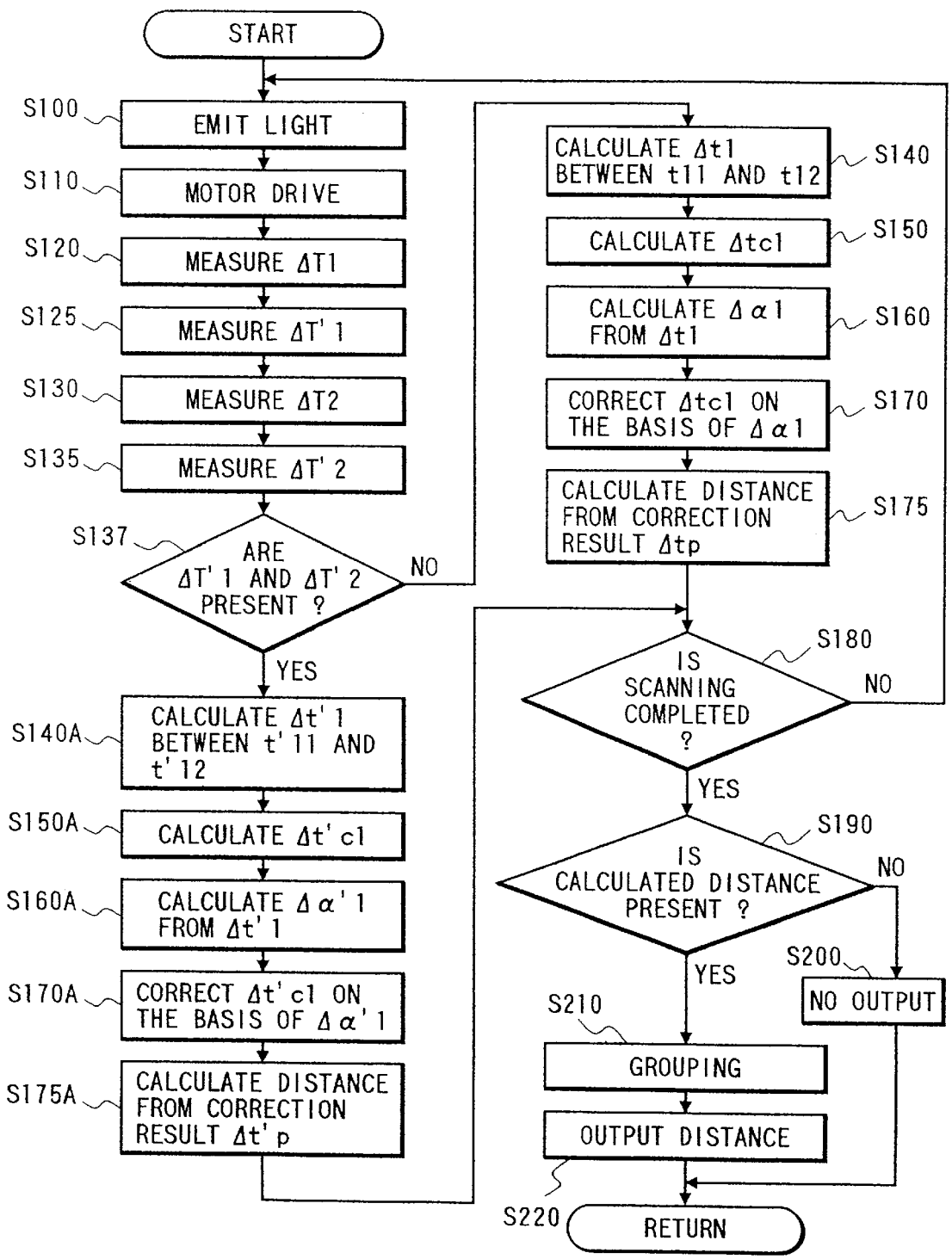
FIG. 15 is a flowchart of a segment of a program for controlling a calculating section in FIG. 13.

The calculating section 33A includes a microcomputer or a similar device having a combination of an I/O port, a ROM, a RAM, and a CPU. The calculating section 33A operates in accordance with a control program stored in the ROM. FIG. 15 is a flowchart of a segment of this control program. The program segment in FIG. 15 is reiterated at a given period.

With reference to FIG. 15, a first step S100 of the program segment outputs a start pulse PA to the drive circuit 45 and the time measurement circuit 61A. For the drive circuit 45, the start pulse PA corresponds to a control signal or a drive signal. The drive circuit 45 activates the laser diode 39 in response to the start pulse PA. As a result, the laser diode 39 emits a pulse of a forward laser light beam H.

A step S110 following the step S100 controls the motor driver 49 so that the angular position of the mirror 47 will vary by a predetermined unit angle. Iterative execution of the step S110 enables a given angular range in front of the subject vehicle to be scanned by the forward laser light beam H.

A step S120 subsequent to the step S110 derives information of the time difference (the time interval) ΔT1 from the output signal of the time measurement circuit 61A. When the voltage V of the output signal of the variable-gain amplifier 53 is higher than the given threshold voltage V3, the comparator 57 outputs a high-level signal to the time measurement circuit 61A. Otherwise, the comparator 57 outputs a low-level signal to the time measurement circuit 61A. The output signal of the comparator 57 which is in the high-level sate corresponds to a first stop pulse PB. The time measurement circuit 61A detects the time interval between the moment of the trailing edge of the start pulse PA and the moment of the leading edge of the first stop pulse PB, and also the time interval between the moment of the trailing edge of the start pulse PA and the moment of the trailing edge of the first stop pulse PB. The time difference ΔT1 is equal to the time interval between the moment of the trailing edge of the start pulse PA and the moment of the leading edge of the first stop pulse PB.

A step S125 following the step S120 derives information of the time difference (the time interval) ΔT'1 from the output signal of the time measurement circuit 61A. When the voltage V of the output signal of the variable-gain amplifier 53 is higher than the given threshold voltage V4, the comparator 65 outputs a high-level signal to the time measurement circuit 61A. Otherwise, the comparator 65 outputs a low-level signal to the time measurement circuit 61A. The output signal of the comparator 65 which is in the high-level sate corresponds to a second stop pulse PB'. The time measurement circuit 61A detects the time interval between the moment of the trailing edge of the start pulse PA and the moment of the leading edge of the second stop pulse PB', and also the time interval between the moment of the trailing edge of the start pulse PA and the moment of the trailing edge of the second stop pulse PB'. The time difference $\Delta T'1$ is equal to the time interval between the moment of the trailing edge of the start pulse PA and the moment of the leading edge of the second stop pulse PB'.

A step S130 subsequent to the step S125 derives information of the time difference (the time interval) $\Delta T2$ from the output signal of the time measurement circuit 61A. The time difference $\Delta T2$ is equal to the time interval between the moment of the trailing edge of the start pulse PA and the moment of the trailing edge of the first stop pulse PB.

A step S135 following the step S130 derives information of the time difference (the time interval) $\Delta T'2$ from the output signal of the time measurement circuit 61A. The time difference $\Delta T'2$ is equal to the time interval between the moment of the trailing edge of the start pulse PA and the moment of the trailing edge of the second stop pulse PB'.

A step S137 subsequent to the step S135 decides whether or not both the time differences $\Delta T'1$ and $\Delta T'2$ are present. When both the time differences $\Delta T'1$ and $\Delta T'2$ are present, the program advances from the step S137 to a step S140A. Otherwise, the program advances from the step S137 to a step S140.

The step S140 calculates the intensity-representing time interval $\Delta t1$ (or $\Delta t2$) from the time differences $\Delta T1$ and $\Delta T2$ according to the previously-indicated equation (1).

A step S150 following the step S140 calculates the time interval $\Delta tc1$ (or $\Delta tc2$) between the moment of the trailing edge of the start pulse PA and the middle point tc1 (or tc2) from the time differences $\Delta T1$ and $\Delta T2$ according to the previously-indicated equation (2).

A step S160 subsequent to the step S150 calculates the corrective time $\Delta \alpha 1$ (or $\Delta \alpha 2$) from the intensity-representing time interval $\Delta t1$ (or $\Delta t2$) by referring to the map in FIG. 5.

A step S170 following the step S160 corrects the time interval $\Delta tc1$ (or $\Delta tc2$) in accordance with the corrective time $\Delta \alpha 1$ (or $\Delta \alpha 2$), and thereby calculates the time difference $\Delta tp$ between the moment of the trailing edge of the start pulse PA and the moment tp at which the voltage V of the output signal of the variable-gain amplifier 53 peaks. Specifically, the calculation of the time difference $\Delta tp$ is carried out by referring to the previously-indicated equation (3).

A step S175 subsequent to the step S170 calculates the distance to the object causing the reflected light beam H on the basis of the time difference Atp. Specifically, the distance in question is given as being equal to the time difference $\Delta tp$ multiplied by "c/2" where "c" denotes the speed of light. After the step S175, the program advances to a step S180.

The step S140A calculates the intensity-representing time interval $\Delta t'1$ (or $\Delta t'2$) from the time differences $\Delta T'1$ and $\Delta T'2$ according to an equation similar to the previously-indicated equation (1).

A step S150A following the step S140A calculates the time interval $\Delta t'c1$ (or $\Delta t'c2$) between the moment of the trailing edge of the start pulse PA and the middle point t'c1 (or t'c2) from the time differences $\Delta T'1$ and $\Delta T'2$ according to an equation similar to the previously-indicated equation (2).

A step S160A subsequent to the step S150A calculates the corrective time $\Delta \alpha'1$ (or $\Delta \alpha'2$) from the intensity-representing time interval $\Delta t'1$ (or $\Delta t'2$) by referring to the map in FIG. 5 or another map predetermined in consideration of the given threshold voltage V4.

A step S170A following the step S160A corrects the time interval $\Delta t'c1$ (or $\Delta t'c2$) in accordance with the corrective time $\Delta \alpha'1$ (or $\Delta \alpha'2$), and thereby calculates the time difference $\Delta t'p$ between the moment of the trailing edge of the start pulse PA and the moment tp at which the voltage V of the output signal of the variable-gain amplifier 53 peaks. Specifically, the calculation of the time difference $\Delta t'p$ is carried out by referring to an equation similar to the previously-indicated equation (3).

A step S175A subsequent to the step S170A calculates the distance to the object causing the reflected light beam H on the basis of the time difference $\Delta t'p$. Specifically, the distance in question is given as being equal to the time difference $\Delta t'p$ multiplied by "c/2" where "c" denotes the speed of light. After the step S175A, the program advances to the step S180.

The step S180 decides whether or not the given angular range in front of the subject vehicle has been scanned by the forward laser light beam H, that is, whether or not the angular position of the mirror 47 has reached a given end position. According to a first example, the decision by the step S180 is carried out in response to the information of the control of the motor driver 49. According to a second example, the decision by the step S180 is carried out by counting the number of times of execution of the step S110, and by comparing the counted number of times with a predetermined reference number of times. When the given angular range in front of the subject vehicle has been scanned by the forward laser light beam H, the program advances from the step S180 to a step S190. Otherwise, the program returns from the step S180 to the step S100.

The step S190 decides whether or not at least one data piece of the calculated distance is present. When at least one data piece of the calculated distance is present, the program advances from the step S190 to a step S210. Otherwise, the program advances from the step S190 to a step S200.

The step S200 stores information of the absence of any data piece of the calculated distance. The step S200 does not output any data piece of the calculated distance to an external device. After the step S200, the current execution cycle of the program segment ends and then the program returns to a main routine.

When a plurality of data pieces of the calculated distances are present, the step S210 separates the data pieces into a group or groups according to the calculated distances represented thereby. When only a single data piece of the calculated distance is present, the step S210 does not execute the grouping.

A step S220 following the step S210 outputs the data piece of the calculated distance or the data pieces of the calculated distances in the respective groups (or the group) to the external device. After the step S220, the current execution cycle of the program segment ends and then the program returns to a main routine.

Figure 16:
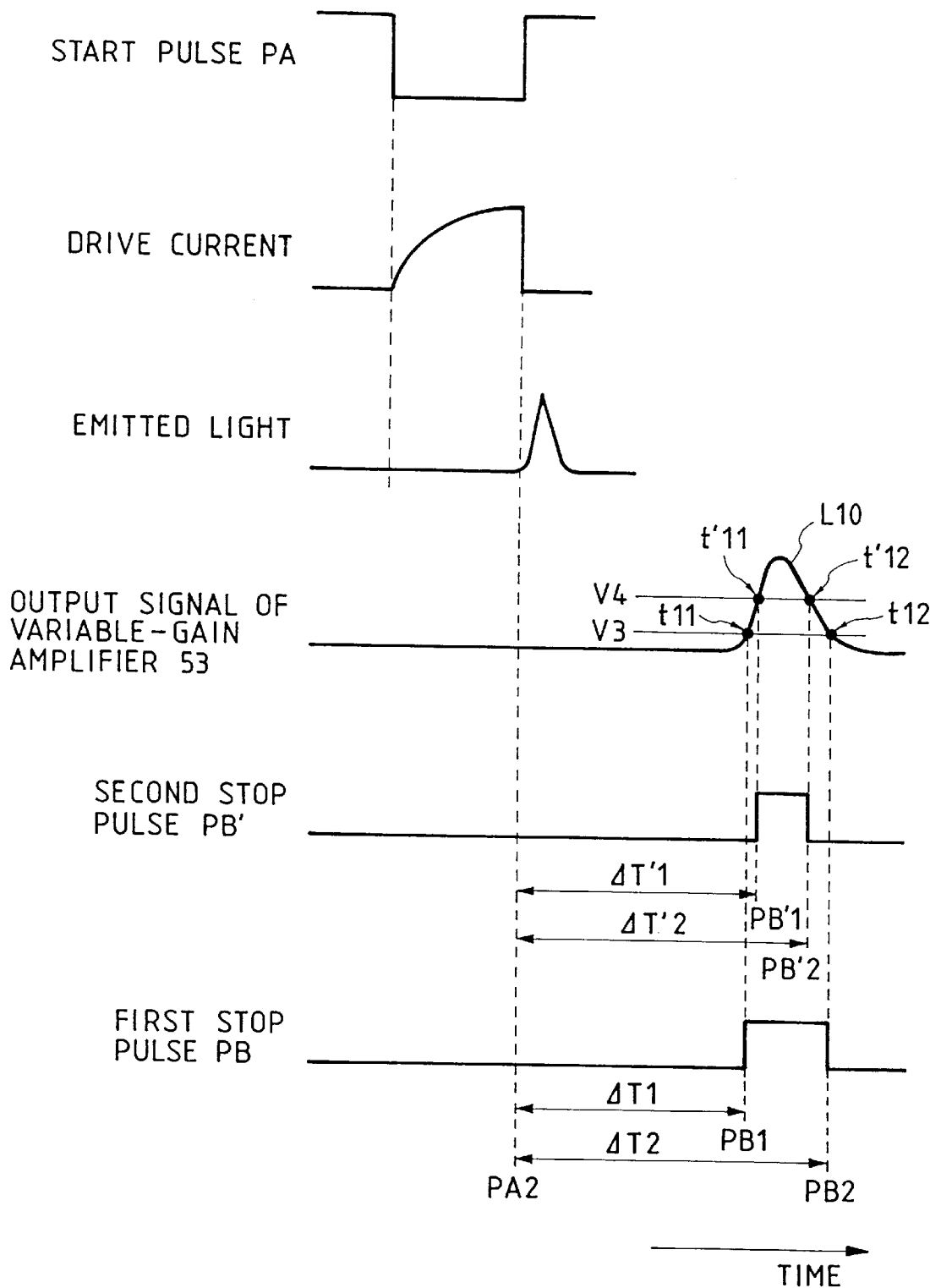
FIG. 16 is a time-domain diagram of various signals in the distance measuring apparatus of FIG. 13.

With reference to FIG. 16, the start pulse PA is of the negative type. The drive circuit 45 generates a first-order drive current in response to the start pulse PA. The drive circuit 45 feeds the drive current to the laser diode 39. The laser diode 39 is activated by the drive current. As a result, the laser diode 39 emits a pulse of the forward light beam H at a moment substantially the same as or immediately following the moment PA2 of the trailing edge of the start pulse PA. At a later moment t11, the voltage V of the output signal of the variable-gain amplifier 53 rises across the given threshold voltage V3 so that the first stop pulse PB starts to occur. At a subsequent moment t'11, the voltage V of the output signal of the variable-gain amplifier 53 rises across the given threshold voltage V4 so that the second stop pulse PB' starts to occur. At a moment t'12 following the moment t'11, the voltage V of the output signal of the variable-gain amplifier 53 drops across the given threshold voltage V4 so that the second stop pulse PB' ends. At a subsequent moment t12, the voltage V of the output signal of the variable-gain amplifier 53 drops across the given threshold voltage V3 so that the first stop pulse PB ends. The time measurement circuit 61A measures the time interval ΔT1 between the moment PA2 of the trailing edge of the start pulse PA and the moment PB 1 of the leading edge of the first stop pulse PB. Also, the time measurement circuit 61A measures the time interval ΔT2 between the moment PA2 of the trailing edge of the start pulse PA and the moment PB2 of the trailing edge of the first stop pulse PB. In addition, the time measurement circuit 61A measures the time interval ΔT'1 between the moment PA2 of the trailing edge of the start pulse PA and the moment PB'1 of the leading edge of the second stop pulse PB'. Also, the time measurement circuit 61A measures the time interval ΔT'2 between the moment PA2 of the trailing edge of the start pulse PA and the moment PB'2 of the trailing edge of the second stop pulse PB'.

As understood from the previous explanation, in the case of a received light beam H having a peak intensity which is high such that the voltage V of the output signal of the variable-gain amplifier 53 exceeds the given threshold voltage V4, calculation is given of the time interval ΔT'1 between the moment of the trailing edge of the start pulse PA and the moment t'11 at which the voltage V of the output signal of the variable-gain amplifier 53 increases across the given threshold voltage V4. Then, the distance in question is measured on the basis of the calculated time interval ΔT'1. Accordingly, it is possible to reduce the influence of noise on the distance measurement.

What is claimed is:

1. A distance measuring apparatus comprising:
    wave transmitting means for emitting a transmission wave;
    wave receiving means for receiving a reflection wave, which results from reflection of the transmission wave by a reflection object, as a reception wave;
    time difference measuring means for measuring a time difference between a moment at which the wave transmitting means emits the transmission wave and a moment at which the wave receiving means receives the reception wave;
    distance calculating means for calculating a distance to the reflection object on the basis of the time difference calculated by the time difference measuring means; and
    error correcting means for detecting a time interval during which a signal level of the reception wave remains higher than a predetermined threshold level, and for correcting an error in the calculated distance to the reflection object on the basis of the detected time interval, the error being caused by a difference in intensity of the reception wave.

2. A distance measuring apparatus according to claim 1, wherein the error correcting means comprises:
    time interval calculating means for calculating the time interval during which the signal level of the reception wave remains higher than the predetermined threshold level; and
    time difference correcting means for correcting the time difference, measured by the time difference measuring means, on the basis of the calculated time interval.

3. A distance measuring apparatus according to claim 1, wherein the error correcting means comprises:
    time interval calculating means for calculating the time interval during which the signal level of the reception wave remains higher than the predetermined threshold level; and
    distance correcting means for correcting the distance to the reflection object, which is calculated by the distance calculating means, on the basis of the calculated time interval.

4. A distance measuring apparatus according to claim 2, wherein the time interval calculating means comprises signal level judgment means for inputting a signal of the reception wave into the time difference measuring means while the signal level of the reception wave remains higher than the predetermined threshold level.

5. A distance measuring apparatus according to claim 2, wherein the time difference correcting means comprises:
    reference time difference calculating means for calculating a second time difference between the moment of emission of the transmission wave and a middle point in the time interval during which the signal level of the reception wave remains higher than the predetermined threshold level; and
    means for correcting the time difference, measured by the time difference measuring means, on the basis of the calculated second time difference.

6. A distance measuring apparatus according to claim 2, wherein the time difference correcting means comprises:
    means for detecting a second time difference between the moment of emission of the transmission wave and a moment at which the signal of the reception wave rises or drops to the predetermined threshold level; and
    means for correcting the time difference, measured by the time difference measuring means, on the basis of the calculated second time difference.

7. A distance measuring apparatus according to claim 4, further comprising:
    second signal level judgment means having a second predetermined threshold level higher than the previously-indicated predetermined threshold level; and
    means for correcting the time difference, measured by the time difference measuring means, on the basis of a time interval during which the signal of the reception wave remains higher than the second predetermined threshold level.

8. A method of measuring a distance, comprising the steps of:
    detecting a time difference between a moment of emission of a transmission wave and a moment of reception of a reflection wave as a reception wave which results from reflection of the transmission wave by a reflection object;
    calculating a distance to the reflection object from the detected time difference;

detecting a time interval during which a signal level of the reception wave remains higher than a predetermined threshold level; and correcting the calculated distance to the reflection object on the basis of the detected time interval.

9. A method according to claim 8, wherein the time difference is corrected into a correction-resultant time difference on the basis of the time interval during which the signal level of the reception wave remains higher than the predetermined threshold level, and the distance to the reflection object is calculated on the basis of the correction-resultant time difference.

10. A method according to claim 8, wherein detection is made as to a second time difference between the moment of emission of the transmission wave and a middle point in the time interval during which the signal level of the reception wave remains higher than the predetermined threshold level, and the second time difference is corrected on the basis of the time interval.

11. A method according to claim 10, wherein the second time difference between the moment of emission of the transmission wave and the middle point is corrected to be equal to a time difference between the moment of emission of the transmission wave and a moment at which the signal level of the reception wave reaches a maximum level.

12. A method according to claim 8, wherein detection is made as to a second time difference between the moment of emission of the transmission wave and a moment at which the signal of the reception wave rises or drops to the predetermined threshold level, and the second time difference is corrected on the basis of the time interval.

13. A method according to claim 12, wherein the second time difference between the moment of emission of the transmission wave and the moment at which the signal of the reception wave rises or drops to the predetermined threshold level is corrected to be equal to a time difference between the moment of emission of the transmission wave and a moment at which the reception wave starts to rise.

14. A method according to claim 8, wherein a second predetermined threshold level is higher than the previously-indicated predetermined threshold level, and the time difference is corrected on the basis of a time interval during which the signal of the reception wave remains higher than the second predetermined threshold level.

15. An apparatus for measuring a distance to an object, comprising:

first means for emitting a forward wave toward the object;

second means connected to the first means for detecting a first moment at which the first means emits the forward wave toward the object;

third means for receiving an echo wave coming from the object, and for converting the echo wave into a corresponding electric signal, the echo wave resulting from reflection of the forward wave by the object;

fourth means for deciding whether or not a level represented by the electric signal generated by the third means is higher than a predetermined threshold level;

fifth means responsive to a result of the deciding by the fourth means for detecting a second moment at which the level represented by the electric signal increases across the predetermined threshold level;

sixth means responsive to the result of the deciding by the fourth means for detecting a time interval during which the level represented by the electric signal remains higher than the predetermined threshold level;

seventh means for estimating a third moment, at which the echo wave reaches the third means, in response to the second moment detected by the fifth means and the time interval detected by the sixth means;

eighth means for calculating a time difference between the first moment detected by the second means and the third moment estimated by the seventh means; and ninth means for measuring the distance to the object in response to the time difference calculated by the eighth means.

* * * * *